(No Model.)　　　　　　　　　　　　　　　　5 Sheets—Sheet 1.
L. GUTMANN.
ELECTRIC MOTOR.
No. 458,162.　　　　　　　　　Patented Aug. 25, 1891.
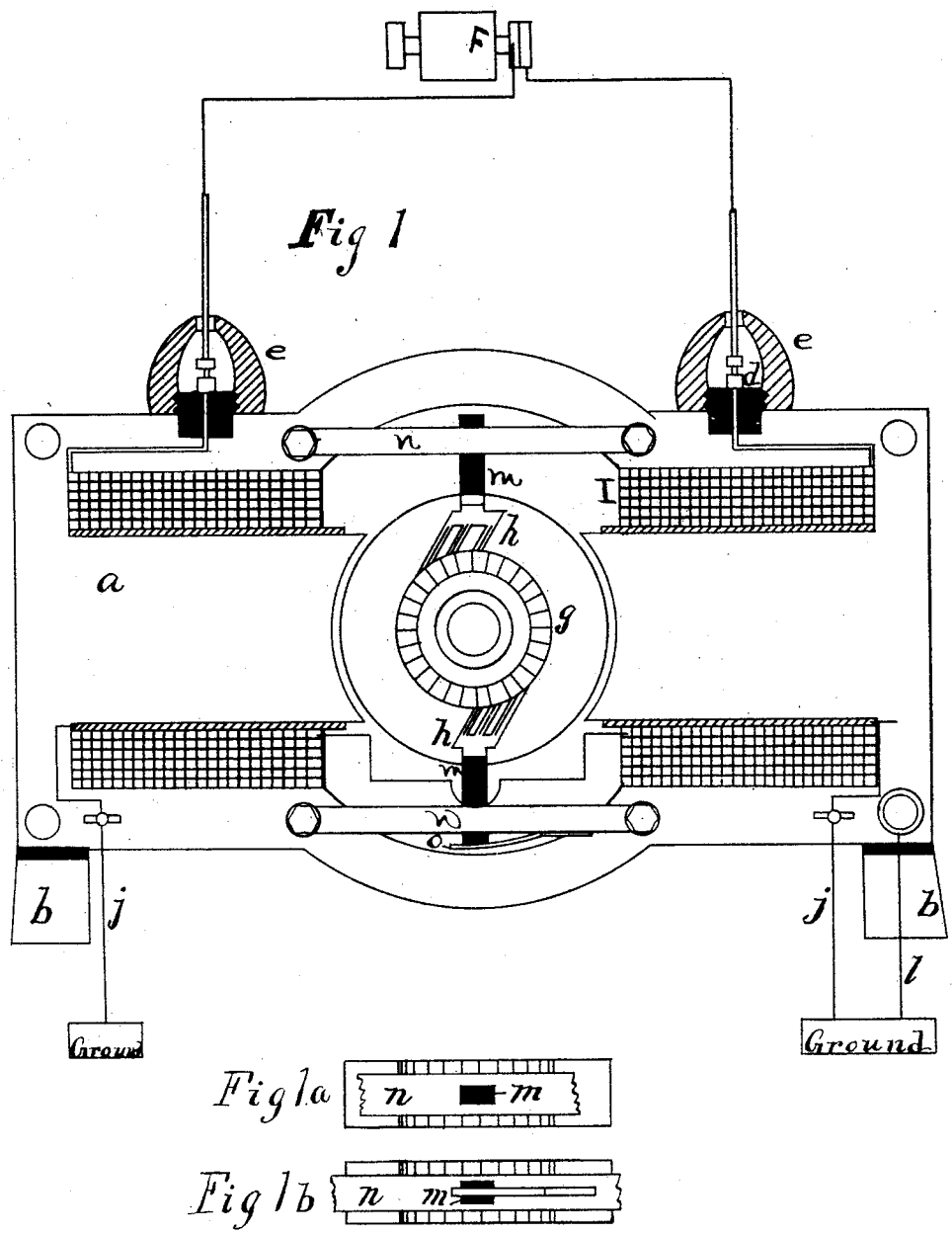
Attest
B. Norman
W. Hammond
Inventor
Ludwig Gutmann
By his Attorney
Edward P. Thompson (No Model.) 5 Sheets—Sheet 2.
L. GUTMANN.
ELECTRIC MOTOR.
No. 458,162. Patented Aug. 25, 1891.
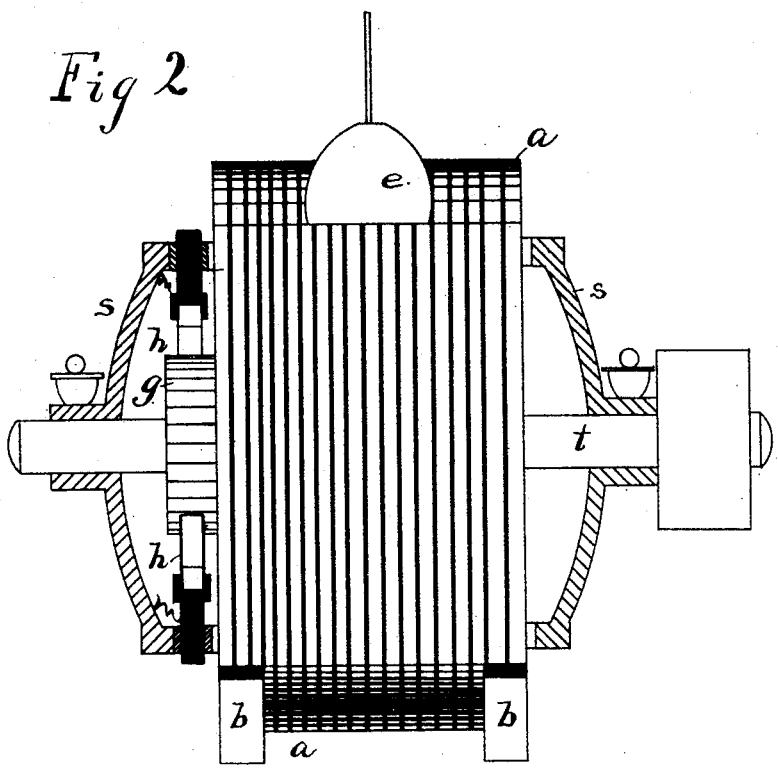
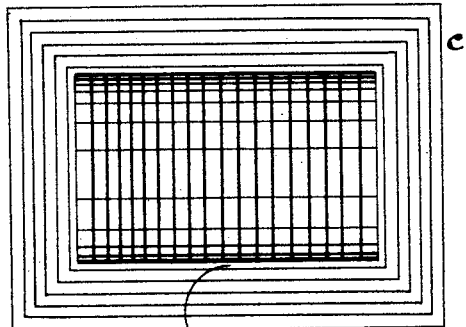

(No Model.) 5 Sheets—Sheet 3.

L. GUTMANN.
ELECTRIC MOTOR.

No. 458,162. Patented Aug. 25, 1891.

Attest
B. Norman
W. Hammond

Inventor
Ludwig Gutmann
By his Attorney
Edward P. Thompson (No Model.) 5 Sheets—Sheet 4.

L. GUTMANN.
ELECTRIC MOTOR.

No. 458,162. Patented Aug. 25, 1891.

Witnesses:
D. W. Gardner
Nellie L. Pope.

Inventor:
Ludwig Gutmann
By his Attorney
Edward P. Thompson

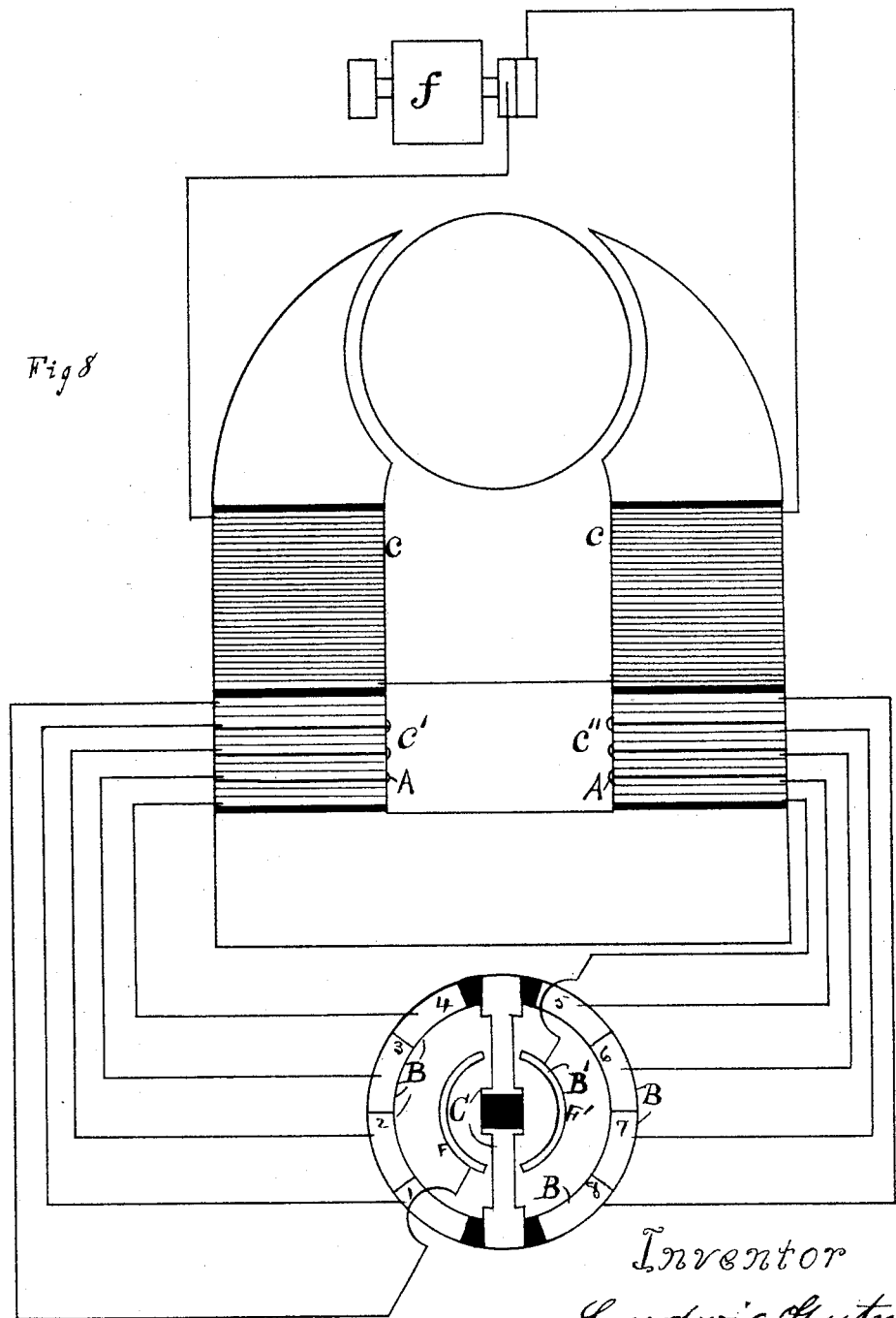

UNITED STATES PATENT OFFICE.

LUDWIG GUTMANN, OF FORT WAYNE, INDIANA.

ELECTRIC MOTOR.

SPECIFICATION forming part of Letters Patent No. 458,162, dated August 25, 1891.

Application filed December 1, 1888. Serial No. 292,386. (No model.)

*To all whom it may concern:*

Be it known that I, LUDWIG GUTMANN, a subject of the German Emperor, and a resident of Fort Wayne, in the county of Allen and State of Indiana, have invented a certain new and useful Improvement in Electric Motors, of which the following is a specification.

My invention relates to an electric motor so constructed as to operate by the action of an alternating or similar inducing electric current.

The object of the invention is to provide an electric motor of the above-named nature, such that it will serve as an economic motor having as high an efficiency as the ordinary type of direct-current motor. I have discovered that if I send through the field-magnet coils of a motor (with subdivided or laminated iron core) an alternating electric current that the armature (whether of the independent coil or open or closed coil type) will revolve if some of the armature-coils are short-circuited in a novel manner and the equilibrium in the armature thereby disturbed. This principle is that underlying my motor, and its application thereto is described by reference to the accompanying drawings.

Figure 4:
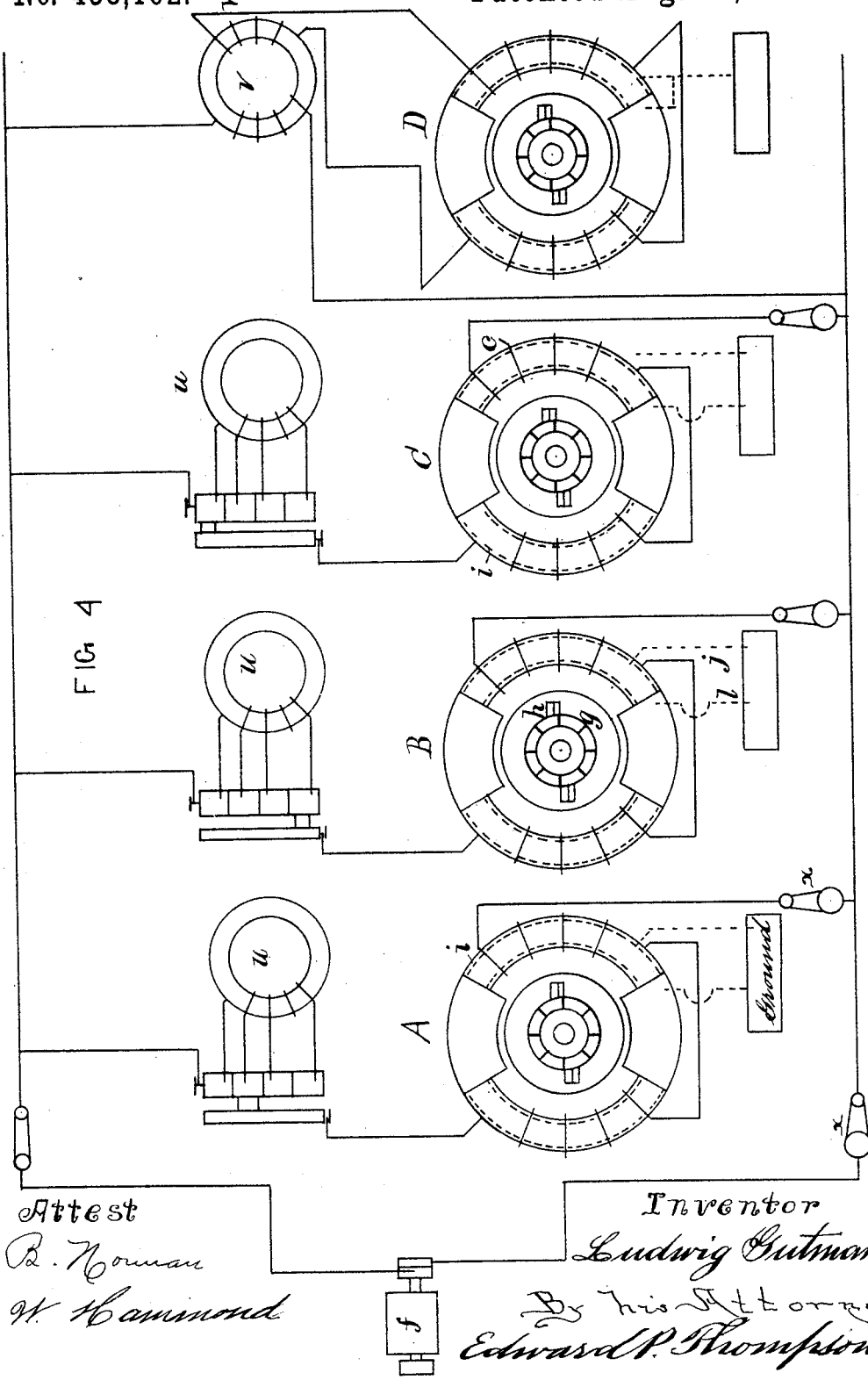
Figure 6:
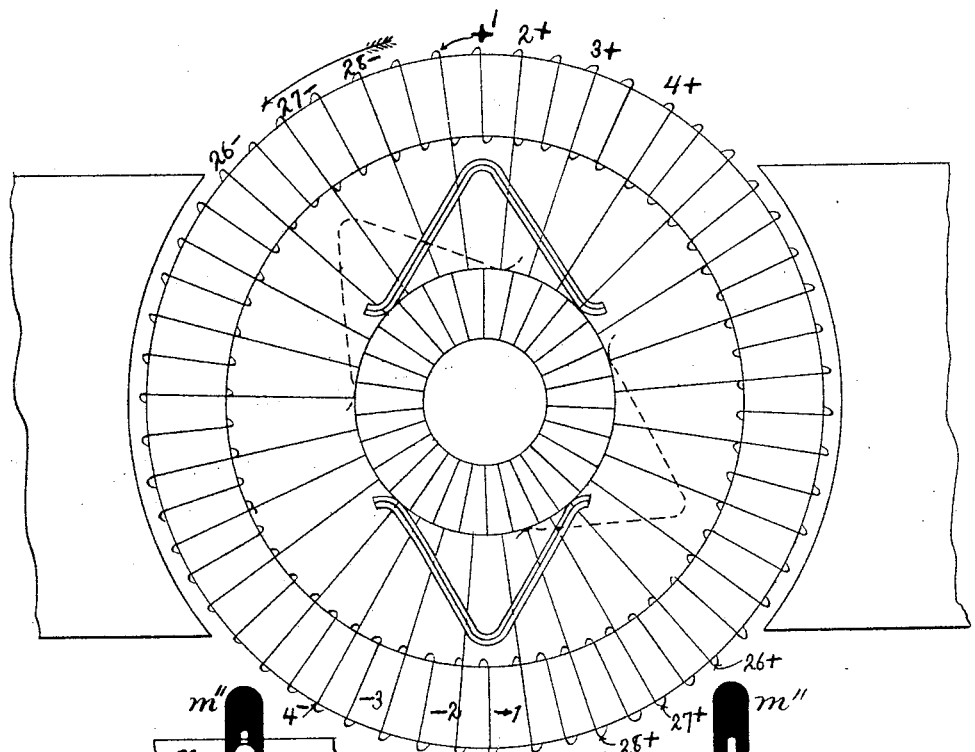
Figure 5:
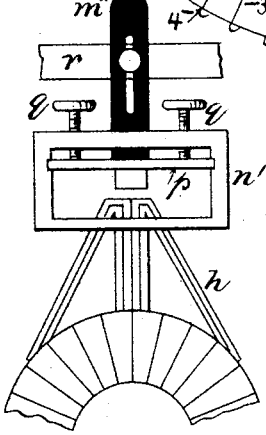
Figure 7:
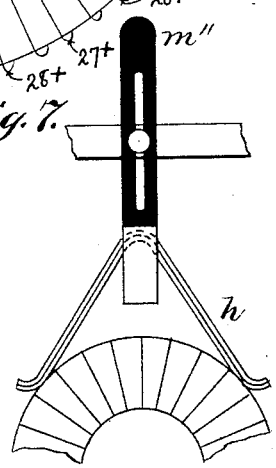

Figure 1 is a vertical section of the motor at right angles to the axis of the armature, which, together with the commutator, is not shown in section, but in end view. Fig. 1$^a$ is a view of the top, and Fig. 1$^b$ a view of the bottom or lower, commutator-brush holder, the upper brush resting by gravity or spring-pressure like in every dynamo, and the lower one also by force of a spring upon the commutator. Fig. 2 is a view in elevation of one end of the complete motor, a portion of the same being shown in section, and the field-magnet coil being shown in Fig. 3, as it would cause confusion if entered in Fig. 2. In Fig. 3 is shown also the earth connection and the field-magnet core in part. Fig. 4 represents the application of the motor to work circuits, the four motors shown being differently connected up in the circuit. Fig. 5 is a modification of the construction of the brush, while Fig. 7 is another modification. Fig. 6 illustrates, partly in diagram, one way in which the coils of the armature may be short-circuited by the brushes, and by which figure the reason of continuous rotation may be understood. Fig. 8 shows means for regulation.

The device consists of the combination of field-magnets built up of superposed insulated plates $a$, each of such a shape as to be comparable to a double E, connected by arc-shaped pieces H, insulated legs $b$ for supporting the said magnets in an insulated condition from the earth, coils $c$ of the electrical conductors wound upon the said cores as to the central portion of the double E and having their terminals connected to the binding-posts $d$, which are insulated from the field-magnet cores, screw-caps $e$, screwed upon the insulators of the said posts, and through which the said conductors of the coils are continued to the terminals of the alternating dynamo $f$; an armature whose commutator is represented by the letter $g$, located between the poles of the field-magnets, the armature being of any suitable type mentioned above, brushes or contact-pieces $h$, constructed sufficiently wide as to short-circuit the greater part of the idle coils in the weakest position of the magnetic field and connected in an insulated manner to the motor by suitable supports, and armature-coils whose terminals are indicated in Fig. 6 by numerals plus 1, minus 1, plus 2, minus 2, &c., and which are shown electrically connected to the commutator-plates in such a manner that the brushes embrace a number nearly equal to or larger than the number of armature-coils lying in the neutral position or in position of least activity, a good conducting-cylinder I, of copper, provided with perforations surrounding the poles of the field-magnets and located within the magnet-coils, the said cylinder being connected to earth by the conductor and a second earth connection between the field-magnet cores and represented by the letter $l$.

In Figs. 1, 1$^a$, 1$^b$, and 2 the brushes $h$ are each shown as connected to a piece of insulating material $m$, which passes through holes in supporting-pieces $n$. The contact between the brushes and commutator is established in well-known manner. The upper brush is shown here to establish connection by gravity, while in the case of the lower brush the spring $o$ forces the brush against the commutator. It is evident that springs may be adopted for either brush, or else both may be rigidly fixed and act or yield by the elasticity of the metal the brush is made of.

In Fig. 5 the brush is shown resting upon the commutator (shown in outline) and supported in a frame $n'$, in which is a slide $p$, adapted to be pressed against the brush by means of screws $q$, passing through the said frame, the said frame being attached to an insulator $m'$, provided with a slot through which passes a screw. This screw is attached to the support $r$.

In Fig. 7 the brush is shown to be in contact at both ends with the commutator and supported midway by a wedge-shaped piece $m''$, also provided with a slot to be able to short-circuit more or less commutator-sections by placing the brush nearer to or farther away from the commutator. When the binding-posts $d$ are connected to the poles of the dynamo F, an alternating current traverses the coils C.

Experiments show that if I short-circuit a number of armature-coils diametrically opposite each other and place these short-circuited coils either equally distant from both the field-magnet poles or else in maximum position (just opposite the poles) that there will be no rotation, as the equilibrium of the two equal and opposite currents induced in the armature-coils are undisturbed; but if these short-circuited coils are placed nearer to one field-pole than to the other the equilibrium is disturbed. There will be a difference of potential at the ends of the short-circuiting wires and a current will flow from the point lying in the stronger magnetic field to the point in the weaker position, causing a very powerful repulsion and rotation in the direction toward the wire end lying in the better position. If these coils are permanently short-circuited, they would come to rest when arriving at the point of equal maximum position, as equilibrium is again established. It is therefore necessary to effect a short-circuit, which remains stationary and is prevented to rotate with the armature. If this is obtained, the equilibrium will be constantly disturbed, resulting in constant rotation. This is effected by the use of very wide stationary brushes. I prefer the use of double tangential brushes, each side of the brush forming with the periphery of the commutator an equal or nearly equal angle. The width of the brush for short-circuiting a number of sections depends on the distance of the pole-pieces from one another. If there is a large distance between the field-magnet poles, then it is preferred to have wide brushes; but if the distance from one pole to the other or the gap is small then the brushes have to embrace but a comparatively small number of commutator-sections. It is preferred to make the brushes embrace all or nearly all the coils lying in the neutral or weak position. The reason is that as soon as we shift the brushes in one or the other direction, as shown in Fig. 6, we put one end of the brush in maximum position, while the other end is in neutral or minimum position. A powerful current will flow from the point of maximum position to that of minimum position, and causing a powerful repulsion and rotation toward the point of maximum position, as indicated by the arrows, Fig. 6, the dotted lines indicating the position of the brushes causing that rotation, while in the position in which the brushes are drawn in full no rotation takes place. In this latter case both the brush ends are connecting-coils of equal potential. If the brushes are shifted in the opposite direction, the motor slows quickly down and reverses its direction, because the current enters in the opposite direction into the brush and armature-coils. As it is only required to disturb the equilibrium in the armature to obtain rotation, no outside connections are required from the brushes to any circuit nor to one another. The potential of the current circulating through the brushes being low and the conductivity of said brushes being high, there is no need for insulating the brushes; but it is preferred to separate them from the field-magnets to prevent any strain and the entering of the primary current into the armature-coils. The double tangential brush has been designed for two reasons—first, to permit the use of the same brush for either direction of rotation backward and forward; second, to short-circuit without trouble nearly all the idle portion of the armature-coils, restricting the work exclusively to the coils in best position, and thereby increasing the efficiency of the motor. More or less of the coils in weakest magnetic position can be cut out by fixing the brush $h$, Fig. 7, nearer to the commutator or farther away from it. The farther the brush $h$ being removed the more the ends of the brush will close up and the smaller will be the number of sections embraced; but the more it is approached to the commutator the more the ends will spread. The amount of current circulating through the armature can be regulated by the position of the brushes. As these brushes are independent of the remaining part of the motor and very little or no sparking is observed, it is convenient to inclose them by means of plates S, through which the armature-shaft $t$ passes.

Referring to Fig. 4, the motor A, motor B, and motor C are represented as connected in multiple arc and each in series with a suitable rheostat, by means of which a variable number of resistance-coils can be introduced into the circuit with the field-magnet coils of the motors. This rheostat, preferably an electro-magnetic rheostat, in each case is represented by the letter $u$. The length of the conductor of the field-magnet coils and that of the rheostat combined is so chosen that when the brushes are removed from the commutator the counter electro-motive force which the field-magnet coils and those of the rheostat can together produce should equal or approximately equal the electro-motive force in the line or at the terminals of the generator. If that is so, there is practically no current in the field-magnet coils when the motor is doing no work. The current in the field-magnet coils is increased by reducing the resistance in the exciting-circuit, and as that of the motor is a fixed resistance the variable resistance is the rheostat, the resistance of which can be varied in different ways by varying the amount of iron influenced, by decreasing the capacity of the iron, influencing it by another conductor, or by reducing the length, or, what is the same, reducing the number of coils of the rheostat in circuit with the motor field-coils. The weaker the rheostat is made the less opposing resistance is in the exciting-circuit, and the larger can be in consequence the current flowing. In the case of small motors they may be connected and run economically in secondary electric circuits, as shown by motor D in Fig. 4. The converter is $v$, connected to the generator $f$, and the field-magnet coils are shown connected in the secondary circuit $w$ of the converter.

The object of connecting the conductors $i$ or the core of the field-magnet to ground is to afford greater safety to those who attend the machine.

Referring to Fig. 8, there are additional coils $c'$ and $c''$, independent of each other, next to the coils $c$ upon the field-magnet core, these coils forming secondary conductors for carrying currents induced by the current in the coils $c$. The coils $c'$ and $c''$ are shown open and independent of one another. One terminal of coil $c'$ is connected to the half-circle F, and one terminal of coil $c''$ is connected to the second half-circle marked F'. The coils $c'$ and $c''$ are subdivided, and the subdivisions are connected to the arc-shaped contact-blocks of B and B'. Those of coil $c'$ are connected to the contact-blocks numbered 1, 2, 3, and 4, and those of coil $c''$ are connected to the terminal-blocks marked 5, 6, 7, and 8. If the handle or switch $h$ $h'$, formed either of a single piece or of two insulated contact-pieces, rotates to the right, the half-circles F and F' are respectively connected with the other terminal of the sub-coil connected to block 1 and 5, respectively. It will be noticed that an equal number of reacting-coils are switched on by lever $h$ $h'$, so as to maintain the pole strength of either pole D equal. It is very advantageous to interpose in either of the reacting-coils $c'$ and $c''$ resistances in parallel to consume the current induced and to prevent polar development; but as the combination is fully described and claimed by me in another specification, it is only necessary to mention it at this place. In the position given in the drawings both reacting-coils $c'$ and $c''$ are open. As the lever $h$ $h'$ turns to the right or left, it inserts one, two, three, four, &c., subdivisions of each of the reacting-coils $c'$ $c''$ in series with the former subdivisions. It is evident that the regulation ought to be effected mainly in the exciting-circuit, as the power which the motor will develop will depend on the field strength. Nevertheless it may be convenient to be able to increase or decrease at will the armature-current.

In the above specification a special form of field-magnet has been referred to; but it is evident that the form has little to do with the principle. This form has been chosen as being most effective and simple. Any other form may be used.

I claim as my invention—

1. An alternating-current motor consisting of the combination of field-magnet coils connected to the terminals of an alternating-current generator, an armature provided with coils, and brushes independent and insulated from each other, permanently short-circuiting less than all the armature-coils.

2. In an alternating-current motor, the combination of field-magnet coils connected to a suitable generator, an armature provided with coils connected to a commutator, and brushes each independent and insulated from the other, each having more than one contact-surface in contact with the armature-coils, some of said armature-coils lying in a weak magnetic field, the other in a stronger magnetic field.

3. In a system of alternating-current distribution, the combination of an alternating-current generator, a motor whose field-magnet coils are in circuit with the said generator, external coils also in the same circuit, the length of all the said coils being such that their total length is adapted to produce a counter electro-motive force equal or approximately equal to that of the main line, the motor being in its normal condition and doing no work, and means for including more or less of the external coils into the circuit.

4. In an electric motor, an insulated binding-post, combined with a screw-cap screwed upon the insulation of the said post and provided with an aperture for the passage of the conductor, which may be connected to the said post.

5. In an alternating-current motor, the combination, with an armature, of field-magnet cores, field-exciting coils mounted on said field-magnet cores and connected in circuit with a suitable generator, and subdivided secondary coils, also mounted on the said field-magnet cores, connected to a suitable switch, the latter being provided with a contact-bar adapted to vary the active length of said secondary coils.

6. In an alternating-current motor, the combination of rotary armature-coils and stationary independent brushes or similar contact-pieces permanently short-circuiting idle coils of the armature.

7. In an alternating-electric-current motor, the combination of an armature and brushes or similar contact-pieces, each independent of the other and independent of the remaining part of the motor, each connecting two distant commutator-sections separated from one another by one or more intermediate commutator-sections, the said two sections having a different potential.

8. In an alternating-current motor, field-magnet coils consisting of such a length of conductor as will produce a counter-pressure or counter electro-motive force equal or nearly equal to the pressure in the main line, the brushes of the motor-armature being supposed to be removed.

9. In an alternating-current motor, primary or exciting coils mounted upon the field-magnets and multiple secondary coils also mounted upon the field-magnets within inductive relation of the said primary coils, and means for closing and opening the said secondary coils.

10. In an alternating-current motor, the combination of field-exciting coils having a definite length or capacity, an armature independent of the field-exciting coils, choking-coils in series with the field-exciting coils, and means for increasing the current round the said field-exciting coils.

In testimony that I claim the foregoing as my invention I have signed my name, in presence of two witnesses, this 24th day of November, 1888.

LUDWIG GUTMANN.

Witnesses:
WILLIAM C. RYAN,
CHAS. RYAN.